United States Patent [19]

Korpi

[11] Patent Number: 4,800,754

[45] Date of Patent: Jan. 31, 1989

[54] WIDE-RANGE, ADJUSTABLE FLOWMETER

[75] Inventor: David M. Korpi, Monterey, Calif.

[73] Assignee: Sierra Instruments, Inc., Carmel Valley, Calif.

[21] Appl. No.: 107,490

[22] Filed: Oct. 7, 1987

[51] Int. Cl.$^4$ ............................ G01E 5/00; F15D 1/14
[52] U.S. Cl. ...................................... 73/202; 138/40; 138/42; 138/43; 138/44
[58] Field of Search ..................... 73/202, 203, 204; 138/40, 42, 43, 44, 45

[56] References Cited

U.S. PATENT DOCUMENTS 3,240,233  3/1966  Johnston ............................. 138/44
4,522,058  6/1985  Ewing .................................. 73/202

Primary Examiner—Herbert Goldstein
Attorney, Agent, or Firm—Michael L. Harrison

[57] ABSTRACT

A fluid bypass type flowmeter has a main passage which is configurable to various effective diameters by selectably adding pre-defined additional cross-sections comprised of an adjustable laminar flow element located within a bore for fine adjustment of the full-scale range of the flowmeter, and an adjustable restriction secondary passage for crude adjustments of the range of the meter. With adjustment of the flowmeter, all or a selected portion of the flow to be measured can be diverted through the secondary passage, where a flow measuring device is located, thereby allowing the flowmeter to operate at or near its full scale and thereby improving the accuracy of the flowmeter over various ranges of flow rate. A laminar flow element is employed in the main passage so that the pressure drop across the element varies linearly with flow rate and, accordingly, the ratio of diverted to un-diverted flow is a constant ratio even though the flow rate varies. The secondary passage adjustable restriction is also designed to give laminar flow to obtain linearity over flow rate variations.

5 Claims, 2 Drawing Sheets

FIG_1A
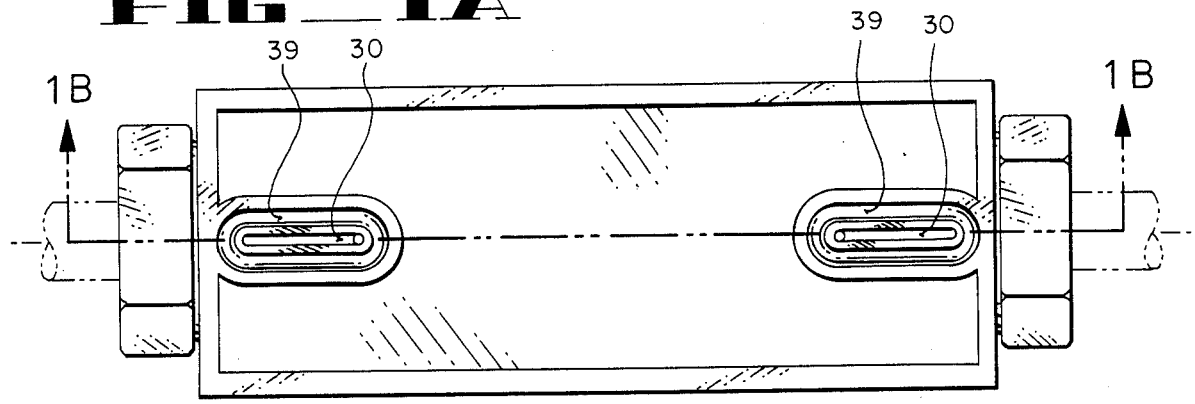
FIG_1B
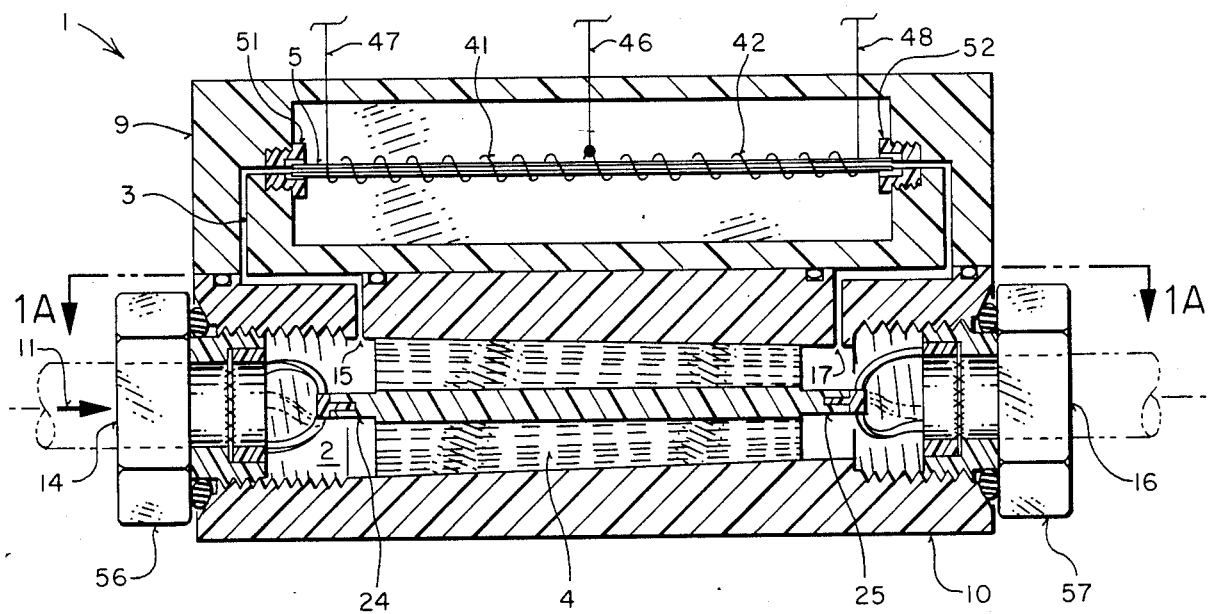
FIG_2A
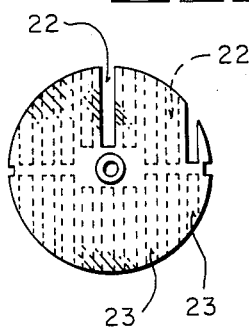
FIG_2B
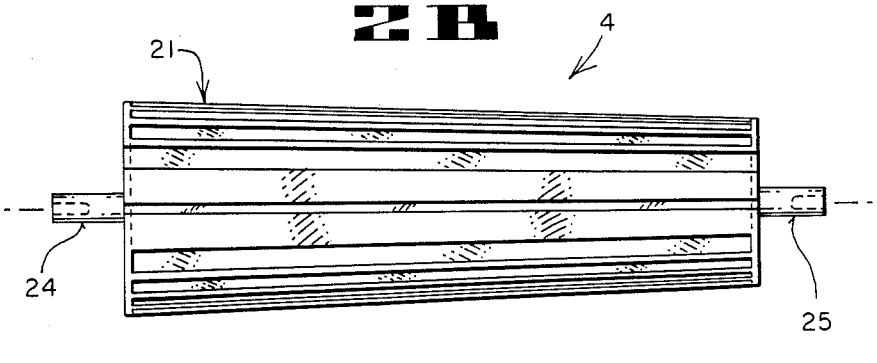

WIDE-RANGE, ADJUSTABLE FLOWMETER

BACKGROUND OF THE INVENTION

1. Field of the Invention

The present invention relates to flowmeters and, in particular, to flowmeters for measuring the rate of fluid flow over a wide range.

2. Prior Art

It is known to the prior art to measure fluid flow by sensing and quantifying selected physical parameters of the flow in a given flow path. One approach to the measurement of fluid flow is that found in U.S. Pat. No. 3,321,970 to Walker, and U.S. Pat. No. 3,037,384 to Good. These patents teach the construction of flowmeters which measure the flow rate of a fluid by sensing a pressure differential across an orifice. The structures disclosed allow accommodation of different ranges of flow rates by placing different sized orifices in the main flow path.

Another type of flowmeter is based upon the principle of sensing the change in temperature of a flowing fluid caused by the addition of a fixed amount of heat. These meters typically use a bypass or secondary flow path for the measurement of the flow rate. Typical mass flowmeters of this type are disclosed in U.S. Pat. No. 2,729,976 issued to Laub, and U.S. Pat. No. 3,938,384 issued to Blair.

The basic principle of measurement of flow rate through mass flowmeters of this type is the effect of differential cooling and heating of coils which are thermally coupled to the fluid passing through the sensor. Coils of resistance wire are wrapped around a sensor tube, one in the upstream and one in the downstream positions. In the simplest case, the coils are identical, or nearly identical, and are assumed to be so for this analysis. In a common configuration, the coils are a part of a Wheatstone bridge, one side of which consists of the coils, and the other side of which consists of fixed resistors. Across the top and bottom of the bridge, i.e., impressed in series with the coils and in series with the fixed resistors which parallel the coils, is a constant current source. From the current source, current flows through the coils creating heat, which heat raises the resistance of the coils, both by an identical amount as long as no fluid flow is present. Fluid flow past the coils causes some of the heat of the upstream coil to be transferred to the fluid. At the downstream side of the coils, the heat coupled into the fluid from the upstream coil is coupled out of the fluid to the downstream coil. Thus, a difference in temperature is created between the two coils, which in turn causes a difference in the resistance of the coils. Across the arms of the bridge, the difference in resistance between the two coils creates a difference in voltage which is proportional to the flow rate through the main passage. The bridge may be balanced by heating the upstream coil by an applied current to cause the resistances to be equal, in which case, the current is the analog of flow rate.

It has long been recognized that the errors of such sensors are greatest when the fluid flow through the sensor is lowest. In by-pass sensors employing heat sensitive bridge arms, this phenomenon is a result of conduction and convection effects due to heat introduced and conducted by the sensor support structure and the surrounding atmosphere, as well as by conduction through the fluid in the sensor tube due to convection even when the fluid in the main passage is not flowing at all. At low flow rates, these effects become significant. At some threshold of fluid flow, they will predominate over the effect of heat transfer in the fluid flow itself. In the vicinity of this threshold, the sensor becomes unusable. Accordingly, to achieve the greatest accuracy in flowmeters of this type, the sensor must be operated at the upper region of its scale. Its greatest accuracy will of course be obtained at the sensor's full scale.

Because flowmeters of this type divert only a relatively minor portion of the flow through the secondary path, the volume of fluid flow available for use in sensing becomes extremely low as flow rates through the main passage become low. These sensor problems have been the subject of inventive effort in the past. U.S. Pat. No. 4,461,173, issued to Olin on July 24, 1984 teaches the improvement of by-pass type flowmeters by the addition of selectable adjustment of the ratio between the quantity of fluid flow in the main branch, and the quantity of fluid flow by-passed to the sensor. By adjustment of this ratio, operation of the sensor at a point closer to full scale may be obtained over a wider range of main branch fluid flows for a given sensor. The Olin '173 patent teaches the provision of two ranges by switching different diameters orifices in series with the main flow passage.

Another source of measurement error is a result of variation in the ratio of the sample of fluid to the main passage fluid as a result of turbulence in the flow. When the ratio changes as a result of turbulence, the fluid flow measured by the sensor is no longer an accurate reflection of the fluid flow in the main passage, regardless of accuracy with which fluid flow is measured in the sensor tube. Similarly, turbulence must be avoided in the sensor tube itself, if the measurement of heat transfer, which changes with turbulence, is to be relied upon as an accurate indication of flow rate.

U.S. Pat. No. 4,487,062, issued Dec. 11, 1984, to Olin and Korpi, discloses the design of a mass flowmeter having a sensor surrounded by a vacuum or a low-pressure, low-conductivity gas, to further reduce the effects of sensor error due to convection heat transfer from one coil to another and to the ambient by means of the atmosphere in the immediate vicinity of the coils, at low flow rates. The flowmeter is provided with a cleanable sensor tube capable of being accessed, without disassembly of the entire unit being required, without loss of the vacuum or low-pressure gas enclosure's seal integrity. The device also recognizes and provides a solution to the problem of turbulence in the main passage as a result of range adjustment devices, by providing a laminar flow element which forces flow within the main passage to be laminar even when the ratio of diameter to length of the passage is insufficient for laminar flow under ordinary conditions in the absence of the laminar flow element.

In the past, there has been no entirely satisfactory solution to the problem of adaptation of flowmeters to use over extremely wide ranges. Each meter has, heretofore been somewhat specialized as to its range. To the extent that adjustment elements have been employed, they have created a vexing problems in terms of inventory maintenance since every element must be stocked in order to achieve the full capability of flow rate range adjustment, and in terms of flexibility of adjustment as each element was uniquely tailored to its particularly specialized range of measurement.

Accordingly, a need exists for a device which can be adapted to use over a wide range of main passage flow rates, while maintaining flow laminarity which is necessary for accuracy over the entire usable scale of the meter.

SUMMARY OF THE INVENTION

The present invention is directed to a fluid flowmeter which includes an adjustable main passage for the flow of the fluid and an adjustable secondary passage for crude adjustments of the range of the meter. In the secondary passage of the flowmeter is a flow sensing device, which can be of generally any type including, for example, those sensing heat flux. An adjustable laminar flow element is located within the primary passage, between the inlet and outlet ends of the secondary passage. Restriction of the main passage by the laminar flow element is used to divert a portion of the fluid flow from the primary passage through the secondary passage. With this type of flowmeter, all or a selected portion of the flow to be measured can be diverted through the passage containing the flow measuring device, thereby allowing the meter to operate at or near its full scale and thereby improving the accuracy of the flowmeter over various ranges of flow rate. The laminar flow element is employed so that the ratio of diverted to undiverted flow is a constant ratio even though the flow rate varies. A secondary flow obstruction, also laminar to obtain linearity over flow rate variations, is inserted in the secondary passages in order to allow gross adjustment of the full-scale range for the flowmeter. For a fuller understanding of the nature and advantages of the invention, reference should be made to the following detailed description taken in conjunction with the accompanying drawings.

BRIEF DESCRIPTION OF THE DRAWINGS

FIG. 1-A is an overall top view of the portion of a flowmeter body containing the main passage showing the location of the secondary flow adjuster in accordance with the present invention.

FIG. 1-B is an overall sectional side view of a flowmeter body in accordance with the present invention showing the placement of the configurable laminar flow element.

FIG. 2-A is an end view of a laminar flow element configurable for variable flow rates in accordance with the present invention.

FIG. 2-B is a side view of a laminar flow element configurable for variable flow rates in accordance with the present invention.

DESCRIPTION OF THE PREFERRED EMBODIMENT

Figure 3B:
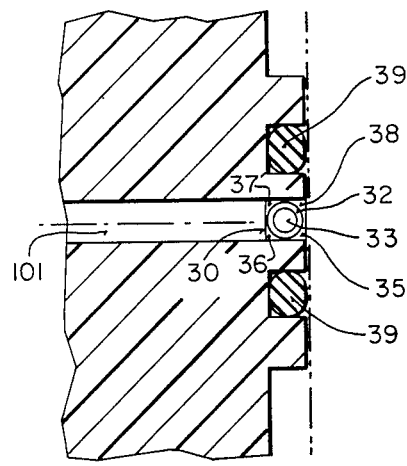
FIG. 3B is a sectional view taken along lines 3B—3B of FIG. 3A.

Referring first to to FIG. 1 the flowmeter 1 is comprised of a body 10 having a primary flow passage 2, a secondary flow passage 3 which communicates with the primary passage 2 at its inlet end 14 and its outlet end 16, a laminar flow element 4 for diverting the flow from the primary passage to the secondary passage, a secondary flow adjuster comprising cavity 30 and flow adjuster element 31 for directly adjusting flow rate in the secondary passage, and a sensor, comprised of coils 41 and 42 and sensor tube 5, for measuring the flow rate of the fluid through the secondary passage 3. Sensor tube 5 is preferably a thin-walled stainless steel tubing such as commercially available hypodermic tubing. Sensor tube 5, located within upper portion 9 of the flowmeter, is supported at its upstream end 51 and its downstream end 52. In between the supports, the tube is insulated as much as is possible against un-accountable thermal cross-talk, and unpredicted thermal losses to ambient and to surrounding structures, the greatest of which losses include transfer by conduction through the tube and its support structure, transfer by convection within the fluid itself, and convection around the sensor tube.

Not shown in FIG. 1, but shown in FIG. 4 and explained in the text below, is the remainder of a bridge circuit, which operates in conjunction with the resistance coils 41 and 42 to measure the flow rate through the secondary passage.

The sensor tube 5 has a diameter substantially less than that of the diameter of main passage 2 and indeed substantially less than that of the remainder of the secondary passages other than the sensor tube 5 and the flow adjuster described below. This relationship is a matter of design choice in order to produce two results: First, it is desired that the sample flow through the secondary passage be only a relatively small percentage of the total flow through the main passage 2 for most applications in order to provide optimum sensing conditions such as a certain minimum flow velocity, and to not disturb the main flow; and second, so that the length of the sensor tube is much greater than its diameter. The latter criterion expresses the condition necessary to achieve laminar flow through the sensor tube 5, the generally accepted rule being, for circular cross-sections, that the length must be at least twenty times the diameter of the tube.

Laminar flow is desired inside the sensor tube for two reasons. First, under laminar flow conditions the pressure drop across the sensor tube will vary linearly with flow rate whereas it would vary as the square of flow rate for a simple orifice, or a tube having diameter comparable to its length. Second, when turbulent flow as opposed to laminar flow occurs in the sensor tube it causes an unpredictable change in the thermal transfer characteristic of the fluid with respect to the sensor coils. Accurate determination of flow rate rests upon the fundamental assumption that the heat transfer to and from the fluid is constant over an assumed range of flow rates. If that condition is not met, the flow rate detected by the meter will depart from the linearly predicted result by the same degree that the actual heat transfer characteristic versus flow rate departs from linear.

Wrapped around the exterior of sensor tube 5 are two resistance coils 41 and 42 of temperature-sensitive resistance wire. The wire used for resistance coils 41 and 42 may be any suitable material having a coefficient of resistance with respect to temperature, which coefficient is preferably high, such as iron-nickel alloy. Electrical lead 47 is connected to one end of resistance coil 41 electrical lead 48 is connected to one end of resistance coil 42. Electrical lead 46 is the electrical center-tap of the resistance coils 41 and 42. Resistance coils 41 and 42 may be in actuality a single resistance coil with a lead 46 connected at its center. The leads 46, 47, 48 and 49 connect with the electrical circuitry (not shown) of the flowmeter. It should also be noted that the resistance coils 41 and 42 shown in FIGS. 1 and 4 are preferably actually in contact with the sensor tube 5 for maximum coupling of heat flow between the tube and the coils, even though the drawings may illustrate them slightly displaced from the sensor tube, for reasons of clarity.

Figure 4:
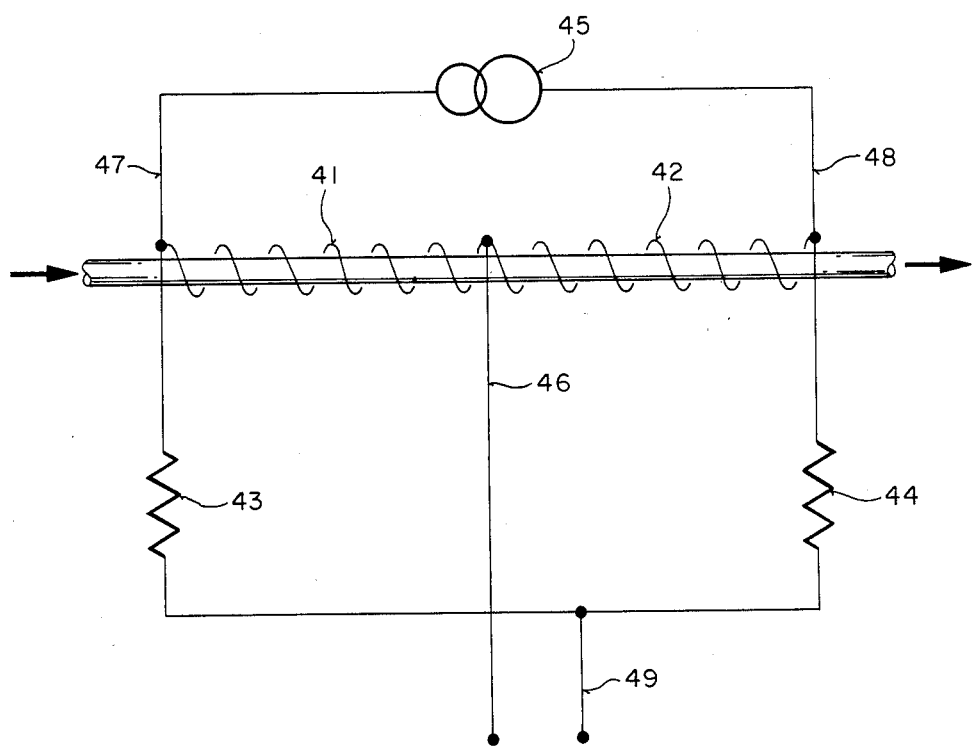
FIG. 4 is a simplified electrical diagram of a mass flowmeter sensor suitable for use with the adjustable ratio flowmeter body and configurable laminar flow element.

Referring now to FIG. 1 and FIG. 4, the basic principle of measurement of flow rate through the flowmeter, which is typical of mass flowmeters of this type, can be understood. The resistance coils 41 and 42 which are wrapped around sensor tube 5 form part of an electronic circuit which includes resistors 43 and 44. Located in the circuit across resistance coils 41 and 42 is a constant current source 45. In operation, current is caused to flow through resistance coils 41 and 42. Current flow through the resistance of resistance coils 41 and 42 creates heat which in turn raises the resistance of the resistance coils. Fluid flow past the resistance coils causes some of the heat of the upstream resistance coil 41 to be transferred to the fluid. At the downstream side of the resistance coils, the heat gained by the fluid is given up to the downstream resistance coil. Thus, a difference in temperature is created between the two resistance coils, which in turn causes a difference in the resistance of the resistance coils. Across the arms of the bridge, the difference in resistance between the two resistance coils creates a difference in voltage which is directly proportional to the flow rate through the main passage. The bridge may be operated in this "unbalanced" mode wherein the voltage measured at the balance points of the bridge is the analog of flow rate, or it may be brought into "balance" by either providing a current to the lower temperature side of the bridge, or by reducing current to the high temperature side of the bridge, in which case the incremental current thus provided or reduced to the bridge will be the analog of flow rate.

Located within the primary flow passage between inlet 15 to the secondary passage 3 and the outlet 17 to the secondary passage 3 is a laminar flow element 4.

The laminar flow element is shown in more detail in FIG. 2. In general, the laminar flow element 4 consists of a body 21 having a cross-section such that it achieves a snug fit with the interior of the primary flow passage 2. Longitudinal to the axis of the laminar flow element 4, and longitudinal to the flow, one or more slots 22 are formed, parallel to the longitudinal axis. Each individual slot 22 is dimensioned such that the ratio of its length to its effective fluid diameter is equal to or greater than twenty-to-one, the conditions under which laminar flow will reliably occur.

The location of the laminar flow element within the primary passage is critical, and is maintained by the use of extensive members 24 and 25 which engage matching fixtures 54 and 55 attached to the inlet and outlet nuts 56 and 57.

The laminar flow element 4 provides a flow restriction which has the characteristic of linearity of pressure over flow rate. Thus, as the flow rate through the primary passage 2 increases, the pressure drop across the laminar flow element 4 also increases, but linearly with flow rate, not exponentially as would occur with a simple orifice. The amount of flow diverted into the secondary passage 3 is therefor also proportional to the primary flow rate even though the primary flow rate varies over its range.

The laminar flow element 4 also causes the flow downstream to have a flatter, more uniform velocity profile, which provides a more accurate recombination of flow in passage 16.

The laminar flow element 4 is configurable to accommodate various full-scale flow rates by selectively removing webbing 23 on the input side of the laminar flow element 4. As the webbing 23 between adjacent walls of the slots 22 is removed, the cross-section of the primary passage is changed, thereby effectively changing the effective diversion ratio between the primary passage 2 and the secondary passage 3. At the maximum, with all webbing 23 removed, the flow rate for a given diversion is maximum. On the other hand, with no webbing 23 removed, the entire flow through primary passage 2 is blocked and diverted through the secondary passage 3. Even with essentially all of the webbing 23 removed, the laminar flow element 4 still causes the effective diameter of the primary passage 2 to be less than the actual unrestricted diameter of primary passage 2, and accordingly serves as a restriction to the primary flow through passage 2 creating a pressure drop between the inlet end 14 and the outlet end 16 of secondary passage 3. This insures that a fraction of the flow from the primary passage 2 will be diverted through secondary passage 3. The laminar flow element may be constructed with varying slot 22 widths, taking care of course to remain within dimensions which will produce laminar flow. For higher flow rate instruments, it will be desired to use wider slots than for low flow rate instruments.

The webbing 22 is preferably molded in rather thin sections to facilitate its removal by simple hand tools by gripping and snapping the webbing away, or by use of a punch.

The ratio of the fluid flow through secondary passage 3 to that through primary passage 2 is generally proportional to the ratio of the effective fluid diameter of laminar flow element 4 to the effective fluid diameter of the secondary passage. This ratio is highly repeatable over a wide range of flow rates.

In operation, the flow to be measured enters flowmeter 1, in the direction shown by arrow 11, through primary passage 2. If the flow rate expected to be measured is a relatively high flow rate, laminar flow element 4 is configured so that its effective fluid diameter is relatively large, i.e., much of the webbing 23 is removed. In this manner, a large percentage of the total flow passes through primary passage 2 with only a relatively minor amount of the flow passing through secondary passage 3 where the flow measuring device is located. To insure more precision in the measurement of the total flow rate, the flowmeter is calibrated over the entire range of flow rates from known calibration standards.

When a relatively low rate of flow must be measured, laminar flow element 4 is configured with much of the webbing 23 remaining in place, so that much or even all of the total flow is diverted from the primary passage 2 to the secondary passage 3. In a like manner, when an intermediate rate of flow must be measured, laminar flow element 4 is configured to have an intermediate percentage of the laminar flow element 4 webbing 23 removed. From this discussion and examples given, it will be apparent that laminar flow element 4 may be utilized to insure that even though the total flow rates to be measured may vary over a wide range, the flow rate through the secondary passage 3 can be caused to remain within a relatively narrow range. Thus, regardless of the actual flow rate through the flowmeter 1, the velocity of the fluid flowing on the secondary passage 3 and in particular in the sensor tube 5 will be maintained within an optimum range for the best sensitivity and repeatability.

Figure 3A:
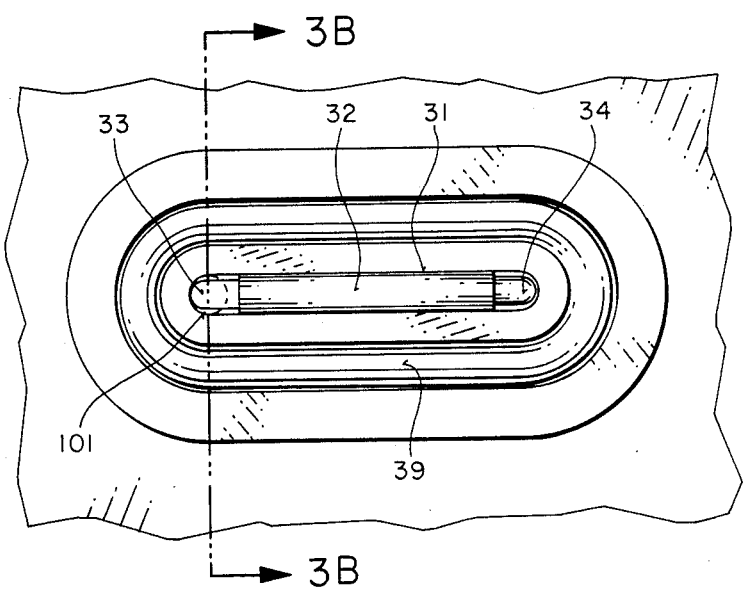
FIG. 3A shows a secondary passage flow adjuster in accordance with the present invention.

Referring now to FIG. 3, there is shown a device for further adjusting the ratio between the primary passage 2 flow rate and the secondary passage 3 flow rate. The flow adjuster comprises a cavity 30 of generally square cross-section, into which may be selectably inserted a flow adjustment element 31, the effect of which when inserted is to decrease the flow, for a given pressure, in the secondary passage. The element 31 is an essentially cylindrical body having a diameter in its central portion 32 which is approximately equal to the length of one of the short sides of the cavity, so that when inserted into the cavity, the central portion 32 makes a snug fit with the cavity 30. At each end of the element are sections 33 and 34 of smaller cross-section in comparison to the central section 32. These sections will be preferably cylindrical for ease of manufacturing. The cavity 30 is preferably open at on long side for ease of access, and is preferably covered by a mating surface (not shown) which is sealed by an "O"-ring 39 which assures that the secondary passage 3 will be leak free. At each end of the cavity is located a port 101 (only one of which is shown) communicating with the remainder of the secondary passage.

The operation of the flow adjuster may be best understood by viewing section A—A in FIG. 3. The diameter of the central section 32 fills all of the square cross-section of the cavity 30 except for the corners. The effective fluid diameter of the corners is small, and by making the length of the cylindrical section sufficiently long, the conditions for laminar flow can be established for fluid flow through the areas defined by the cavity walls and the central section 32 of the flow adjuster 31. Thus, as noted above in the case of the laminar flow element 4, the conditions for laminar flow having been met, the flow adjuster 31 and cavity 30 will produce a restriction which achieves a linear relationship between flow rate and pressure drop.

It should be noted that in order for the flow adjustment to have effect, the effective fluid diameter of the paths 35, 36, 37, and 38 must be small in comparison to the overall diameter of the secondary passage in its unrestricted portions. The effective diameters will preferably be of the same order of magnitude as that of the sensor tube 5.

Although the effective diameters of the flow adjuster passages are small, the remainder of the secondary passage 3 may be of any convenient diameter, without impairment of the flow adjusters function. The ends of the flow adjustment element 33 and 34 allow the fluid from each path to recombine and to re-enter the remainder of the secondary passage 3. Although the flow path will thereafter be turbulent, until the sensor tube or another flow adjuster is reached, the flow rate will still be controlled, as desired, by the flow adjuster.

By creating an adjustable flow restriction in the secondary passage 3, another degree of adjustment is provided whereby the the range of the flowmeter 1 can again be selectably varied. It may be noted also that the opportunity for placing multiple flow adjusters in the secondary passages exists, each of which will provide a further expansion of the range. The embodiment shown employs two flow adjusters, one on the inlet and the other on the outlet side of the sensor tube 5.

Both the laminar flow element 4 and the flow adjuster element 31 are preferably made of moldable material having good dimensional stability. The material must of course be chemically stable in the presence of the fluid to be measured. For the laminar flow element 4, it is also a requirement that the webbing 23 between slots 22 be easily removable without excessive force, and without injury to the adjacent material. A suitable choice of material, having all of these characteristics for most fluids, is one of the chemically inert plastics such as polypropylene or NYLON ™ plastic.

Any one of a number of conventional displays can be used to indicate the output of resistance coil 41, including the use of conventional circuitry to provide a digital display or conventional analog electrical meters. Also, conventional circuitry can be used to provide a linear output signal.

While the embodiment shown in FIG. 1 illustrates a multi-range flowmeter with a resistance detector, coils 42 and 41 could be replaced by static pressure sensing devices which would sense a pressure drop across the restriction caused by the sensor tube 5.

While the preferred embodiments of the present invention have been illustrated in detail, it should be apparent that modifications and adaptations of those embodiments will occur to those skilled in the art. However, it is to be expressly understood that such modifications and adaptations are within the sphere and scope of the present invention as set forth in the following claims.

What is claimed is:

1. A wide-range flowmeter for measuring the mass flow rate of a fluid comprising:
    a housing having a central bore there through defining a primary passage for the fluid and at least one secondary bore defining a secondary passage of lesser diameter communicating at its ends with the primary passage;
    a sensor located within the secondary passage for measuring the rate of mass flow of fluid through the secondary passage; and,
    a configurable laminar flow element located within the primary passage for restricting flow within the primary passage, said laminar flow element having a body having a first end and a second end and having one or more longitudinal slots, each of said slots having a ratio of length to cross-section sufficiently great to produce laminar flow, at least one of said slots having a webbing at the first end normally covering the slot so as to limit fluid flow through said slots, said webbing having the characteristic that it may be disengaged from the body without damage to the body to expose more slots and to thereby change the division ratio between the primary and secondary passages.

2. The apparatus of claim 1 in which the sensor further comprises a resistance coil thermally coupled to the flow in the secondary passage, means for maintaining the resistance coil at a generally constant temperature differential above the temperature of the flowing fluid and means coupled to the resistance to the resistance coil for sensing the electrical power loss of the resistance coil caused by the cooling effect of the flowing.

3. A wide-range flowmeter for measuring the mass flow rate of a fluid comprising:
    a housing having a central bore therethrough defining a primary passage for the fluid and at least one secondary bore defining a secondary passage of lesser diameter communicating at its ends with the primary passage, said secondary passage also containing at some point along its length, at least one flow adjustment cavity for use with a flow adjustment element, said cavity being generally square in cross-section, and of sufficient length that the restricted portion thereof provides laminar flow in the areas surrounding a flow adjustment element;

a sensor located within the secondary passage for measuring the rate of mass flow of fluid through the secondary passage, said sensor comprising a resistance coil thermally coupled to the flow in the secondary passage, means for maintaining the resistance coil at a generally constant temperature differential above the temperature of the flowing fluid and means coupled to the resistance to the resistance coil for sensing the electrical power loss of the resistance coil caused by the cooling effect of the flowing fluid;

a configurable laminar flow element located within the primary passage for restricting flow within the primary passage, said laminar flow element having a body having a first end and a second end and having one or more longitudinal slots, each of said slots having a ratio of length to cross-section sufficiently great to produce laminar flow, at least one of said slots having a webbing at the first end, covering the slot so as to limit fluid flow through said slots, said webbing having the characteristic that it may be removed by breaking away the webbing from the body without damage to the body to expose more slots and to thereby change the division ratio between the primary and secondary passages; and a flow adjusting element, for selectably being placed in the flow adjustment cavity, said element having a generally cylindrical central portion having an effective diameter approximately the same as the length of one of the sides of the flow adjustment cavity.

4. The apparatus of claim 3 wherein the sensor further comprises a resistance coil thermally coupled to the flow in the secondary passage, means for maintaining the resistance coil at a generally constant temperature differential above the temperature of the flowing fluid and means coupled to the resistance to the resistance coil for sensing the electrical power loss of the resistance coil caused by the cooling effect of the flowing fluid.

5. The apparatus of claim 3 wherein the flow adjusting element further comprises two end sections, the cross sections of which are substantially less than that of the central portion.

* * * * *